: US 9,822,892 B2
(45) Date of Patent: Nov. 21, 2017

(12) United States Patent
Miura

(54) TWO-STAGE SWITCH VALVE

(71) Applicant: DENSO CORPORATION, Kariya, Aichi-pref. (JP)

(72) Inventor: Yuichiro Miura, Obu (JP)

(73) Assignee: DENSO CORPORATION, Kariya (JP)

( * ) Notice: Subject to any disclaimer, the term of this patent is extended or adjusted under 35 U.S.C. 154(b) by 175 days.

(21) Appl. No.: 14/809,531

(22) Filed: Jul. 27, 2015

(65) Prior Publication Data
US 2016/0025238 A1 Jan. 28, 2016

(30) Foreign Application Priority Data

Jul. 28, 2014 (JP) .................................. 2014-153124

(51) Int. Cl.
F16K 21/02 (2006.01)
F16K 17/34 (2006.01)
(52) U.S. Cl.
CPC ............... F16K 21/02 (2013.01); F16K 17/34 (2013.01)
(58) Field of Classification Search
CPC ........................................................ F16K 21/02
USPC ...... 137/614, 614.16, 505, 599.01, 110, 497, 137/504, 503, 498, 516.21, 516.23, 137/533.31; 138/45
See application file for complete search history.

(56) References Cited

U.S. PATENT DOCUMENTS

| 2,678,066 A * | 5/1954 | Carter ................... G05D 7/0133 138/45 |
| 3,050,086 A * | 8/1962 | Honsinger ............. G05D 7/012 137/513.5 |
| 2005/0217734 A1 | 10/2005 | Takakura |
| 2013/0048890 A1* | 2/2013 | Miura ................... F16K 17/196 251/129.01 |
| 2015/0027571 A1 | 1/2015 | Kishi et al. |

OTHER PUBLICATIONS

U.S. Appl. No. 14/713,200, filed May 15, 2015, Harada et al.

* cited by examiner

Primary Examiner — Kevin Murphy
Assistant Examiner — Patrick Williams
(74) Attorney, Agent, or Firm — Nixon & Vanderhye PC

(57) ABSTRACT

A two-stage switch valve includes a valve body slidable in a flow passage of a fluid, and a spring urging the valve body upstream. The valve body includes a valve element slidable in the flow passage, an upstream guide having a ring shape and being slidable in the flow passage, and legs connecting the valve element and the upstream guide. The upstream guide is located upstream of the valve element. The legs are inclined from an axial direction of the upstream guide and extend from the upstream guide toward a center of the valve element.

13 Claims, 4 Drawing Sheets

| ELECTROMAGNETIC VALVE | ON | ON |
|---|---|---|
| SWITCH VALVE | CLOSED | OPEN |
| VALVE BEHAVIOR | | |

TWO-STAGE SWITCH VALVE

CROSS REFERENCE TO RELATED APPLICATION

This application is based on and incorporates herein by reference Japanese Patent Application No. 2014-153124 filed on Jul. 28, 2014.

TECHNICAL FIELD

The present disclosure relates to a two-stage switch valve including a valve element that slides upstream or downstream in a flow passage to switch a cross-sectional area of the flow passage.

BACKGROUND

A two-stage switch valve is known (e.g., JP 2005-291241 A corresponding to US 2005/0217734 A1), in which a valve element slides in a flow passage to switch a cross-sectional area of the flow passage. The two-stage switch valve includes the valve element having an outer peripheral edge slidably supported in the flow passage, and a spring urging the valve element upstream in the flow passage.

When a fluid pressure on an upstream side of the valve element in the flow passage increases, and when a pressure on the valve element increases, the valve element moves downstream against an urging force of the spring, and thereby reduces the cross-sectional area of the flow passage. More specifically, when the valve element moves to a downstream valve position, a fluid is prevented from flowing on an outer side of the valve element to bypass the valve element. Thus, the fluid flows only through a communication hole provided in the valve element.

On the other hand, when the fluid pressure on the upstream side of the valve element in the flow passage decreases, and when the pressure on the valve element decreases, the valve element moves upstream by the urging force of the spring, and thereby increases the cross-sectional area of the fluid passage. More specifically, when the valve element moves to an upstream position, the fluid flows on the outer side of the valve element to bypass the valve element with flowing through the communication hole of the valve element. Therefore, the sliding of the valve element causes switching of the cross-sectional area of the flow passage. Accordingly, the fluid pressure is regulated and a flow rate of the fluid is adjusted.

The valve element has a circular plate shape and has a circular cylindrical slide surface that is slidably supported by a cylindrical guide wall surface of the flow passage. In this case, the valve element is high in aspect ratio that is a ratio between a diameter of the valve element and a dimension of the valve element in its sliding direction. Thus, if the valve element inclines slightly, the valve element may get stuck in the flow passage and be difficult to slide on the guide wall surface. Thus, the structure of the valve element may cause malfunction of the two-stage switch valve.

SUMMARY

It is an objective of the present disclosure to provide a two-stage switch valve capable of limiting inclination of a valve element and capable of reducing a flow resistance to a fluid flowing on an outer periphery of the valve element.

According to an aspect of the present disclosure, a two-stage switch valve includes a valve body and a spring. The valve body includes a valve element having an outer circumferential edge slidably supported in a flow passage, and the valve element is subjected to a fluid pressure on an upstream side of the valve element in a flow direction of a fluid in the flow passage. The spring urges the valve element upstream in the flow passage. When the fluid pressure on the upstream side of the valve element is higher than a predetermined pressure, the valve element moves downstream against an urging force of the spring to a predetermined downstream position where the fluid flows from the upstream side to a downstream side of the valve element through a communication hole that extends through the valve element. When the fluid pressure on the upstream side of the valve element is lower than or equal to the predetermined pressure, the valve element moves upstream by the urging force of the spring to a predetermined upstream position where the fluid flows from the upstream side to the downstream side of the valve element through the communication hole and with flowing on an outer periphery of the valve element to bypass the communication hole. The valve body includes an upstream guide and legs. The upstream guide has a ring shape and is supported slidably in the flow passage. The upstream guide is located upstream of the valve element in the flow direction of the fluid. The legs connect the upstream guide and the valve element, and the legs are inclined from an axial direction of the upstream guide. The legs extend from the upstream guide toward a center of the valve element.

The upstream guide is located upstream of the valve element in the flow direction of the fluid, and the outer circumferential edge of the valve element and a circumferential edge of the upstream guide are slidably supported in the flow passage. Accordingly, inclination of the valve element can be prevented, and the valve element can be prevented from getting stuck in the flow passage when the valve element slides in the flow passage. As a result, malfunction of the two-stage switch valve can be prevented.

The legs connecting the upstream guide and the valve element are inclined from the axial direction and extend from the upstream guide toward the center of the valve element. Accordingly, bonded parts between the valve element and the legs are positioned in the vicinity of the center of the valve element. Hence, the bonded parts between the valve element and legs can be prevented from functioning as flow resistance to the fluid flowing on the outer periphery of the valve element. According to the two-stage switch valve of the present disclosure, malfunction can be prevented by limiting the inclination of the valve element, and the flow resistance to the fluid flowing on the outer periphery of the valve element can be reduced.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
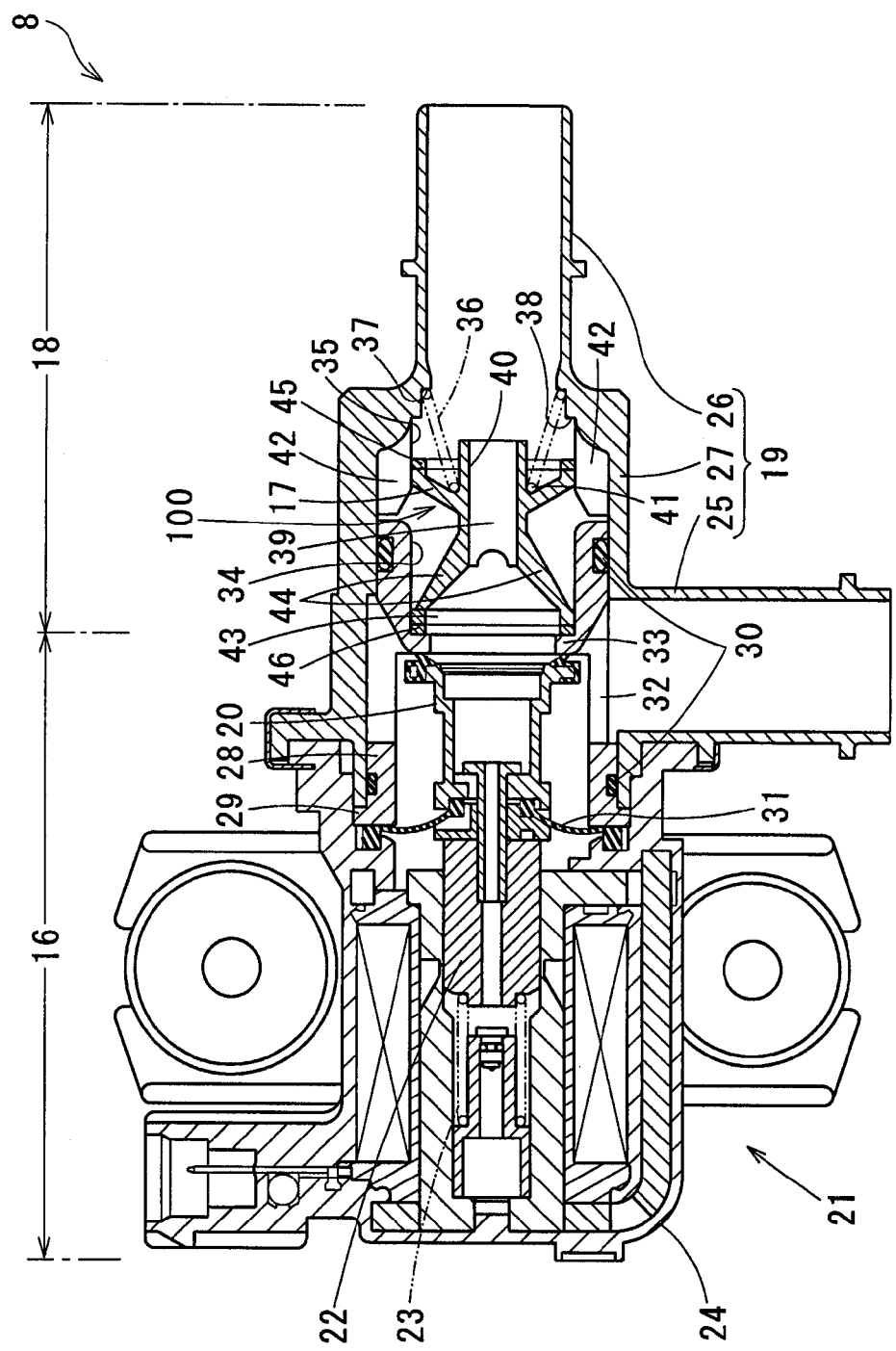
FIG. 1 is a sectional diagram illustrating a two-stage integrated on-off valve including a two-stage switch valve and an electromagnetic valve, according to an exemplar embodiment of the present disclosure.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

An exemplar embodiment of the present disclosure will be described with reference to FIGS. 1 to 6. A fuel vapor treatment device is used for a vehicle including an internal combustion engine 1. The fuel vapor treatment device includes a canister 3 to which a fuel vapor from a fuel tank 2 is adsorbed. The fuel vapor treatment device performs a purge of the fuel vapor adsorbed to the canister 3 by introducing the fuel vapor into an intake passage 4 of the engine 1.

The fuel vapor treatment device includes a fuel vapor passage 5 (breather passage) through which a fuel vapor evaporated in the fuel tank 2 is introduced to the canister 3, a purge passage 6 through which the fuel vapor held in the canister 3 is introduced to a negative-pressure area in the intake passage 4 on a downstream side of a throttle valve in an intake-air flow, a purge valve 7 provided between the purge passage 6 and the intake passage 4 to open or close the purge passage 6 or regulate a cross-sectional open area of the purge passage 6, a two-stage integrated on-off valve 8 provided in the fuel vapor passage 5, two bypass passages (i.e. a first bypass passage 9 and a second bypass passage 10) through which the fuel vapor bypasses the two-stage integrated on-off valve 8, a positive-pressure relief valve 11 provided in the first bypass passage 9, and a negative-pressure relief valve 12 provided in the second bypass passage 10. A controller 13, which performs an engine control, controls operational states of multiple electric functional components used for the fuel vapor treatment device. The controller 13 is referred to as an "ECU 13", hereinafter.

The fuel tank 2 accumulates a liquid fuel such as gasoline, and an upper space above the liquid fuel in the fuel tank 2 is filled with a fuel vapor. A tank pressure sensor 14 is attached to the fuel tank 2 and detects an inner pressure of the upper space of the fuel tank 2. The tank pressure sensor 14 is connected to the ECU 13, and outputs a sensor value of a detected inner pressure to the ECU 13.

The canister 3 includes a container housing an adsorption material (e.g. activated carbon) that adsorbs and holds fuel vapor. The canister 3 communicates with the upper space of the fuel tank 2 through the fuel vapor passage 5. The canister 3 communicates with the negative-pressure area in the intake passage 4 through the purge passage 6. The canister 3 is connected to an atmosphere through an atmosphere passage 15 such that an atmosphere air can be introduced into the canister 3. A canister control valve: CCV is provided in the atmosphere passage 15 and has a structure of an electromagnetic valve. The CCV is not shown in the drawings. An operational state of the CCV is controlled by the ECU 13. When the CCV is open, the atmosphere air is drawn into the canister 3.

The purge valve 7 is a normally closed electromagnetic valve and has a known structure. The purge valve 7 is opened when an electrical energization is applied to the purge valve 7. An operational state of the purge valve 7 is controlled by the ECU 13. When the engine 1 is stopped, an electric supply to the purge valve 7 is cut off, and the purge valve 7 is closed. In an operating time of the engine 1, the ECU 13 controls a state (e.g., duty cycle) of electricity supplied to the purge valve 7 so as to regulate an amount (referred to as a purge amount) of fuel vapor introduced into the intake passage 4. The operating time of the engine 1 may be a predetermined time period since a start of an operation of the engine 1, or a time period when a predetermined operational condition is satisfied, for example, when a negative pressure is generated in an intake air. Alternatively, the operating time of the engine 1 may be all of the time when the engine 1 is in operation.

The ECU 13 performs an operational control of the engine 1. For example, the ECU 13 controls fuel injection via electric controls of multiple injectors. The ECU 13 regulates an open degree of the purge valve 7 in the operating time of the engine 1 to adjust the purge amount of the fuel vapor introduced into the intake passage 4. The ECU 13 calculates a correction value of an injection amount of fuel based on the purge amount. Subsequently, the ECU 13 corrects the injection amount of fuel injected from the injectors by using the calculated correction value. Accordingly, an air-fuel ratio can be kept at a target value appropriate for an operational state of the engine 1. Known technologies are employed for the control of the open degree of the purge valve 7 and the correction of the injection amount based on the purge amount of the fuel vapor.

The first bypass passage 9 and the second bypass passage 10 are communication passages through which an upstream side of the two-stage integrated on-off valve 8 connected to the fuel tank 2 communicates with a downstream side of the two-stage integrated on-off valve 8 connected to the canister 3. The first bypass passage 9 and the second bypass passage 10 may be provided integrally with the two-stage integrated on-off valve 8, or may be provided separately from the two-stage integrated on-off valve 8.

The positive-pressure relief valve 11 is a check valve that opens when an inner pressure of the fuel tank 2 becomes higher than a predetermined upper limit value. For example, the positive-pressure relief valve 11 may have a reed valve structure using a diaphragm or a check valve structure using a ball valve. The negative-pressure relief valve 12 is a check valve that opens when the inner pressure of the fuel tank 2 becomes lower than a predetermined lower limit value. For example, the negative-pressure relief valve 12 may have a reed valve structure using a diaphragm or a check valve structure using a ball valve, similar to the positive pressure relief valve 11.

The positive-pressure relief valve 11 and the negative-pressure relief valve 12 opens or closes mechanically based on the inner pressure of the fuel tank 2. Hence, even when an environmental temperature of the fuel tank 2 changes, the inner pressure of the fuel tank 2 can be maintained within a predetermined range. Therefore, a strength of the fuel tank 2 is not required to be increased more than necessary. The fuel tank 2 can be prevented from cracking, for example, and a manufacturing cost and a weight of the fuel tank 2 can be reduced.

The two-stage integrated on-off valve 8 includes an electromagnetic valve 16 as an example of an electric on-off valve that opens or closes the fuel vapor passage 5, and a two-stage switch valve 18 that changes a cross-sectional area of the fuel vapor passage 5 in stages by sliding of a valve element 17 in the fuel vapor passage 5. The electromagnetic valve 16 and the two-stage switch valve 18 are directly combined with each other to be used as a single member. In the present embodiment, the electromagnetic valve 16 and the two-stage switch valve 18 are coaxial with each other.

The electromagnetic valve 16 is a shutoff valve that hermetically seals the fuel tank 2 when the electromagnetic valve 16 is closed. The electromagnetic valve 16 is a normally closed valve. The electromagnetic valve 16 opens when an electrical energization is applied to the electromagnetic valve 16. The electromagnetic valve 16 includes a valve 20, an electromagnetic actuator 21 and a return spring 23. The valve 20 opens or closes an L-shaped passage 19 (an example of a flow passage) constituting a part of the fuel vapor passage 5. The electromagnetic actuator 21 generates a magnetic attraction force by being electrically energized, and the valve 20 is driven to move in a valve opening direction and be opened by the magnetic attraction force. The return spring 23 urges the valve 20 and an armature 22 of the electromagnetic actuator 21 in a valve closing direction such that the valve 20 is closed.

A structure of the electromagnetic actuator 21 including the return spring 23 may employ a known structure to which various specifications are applicable. Configurations of the valve 20 and the L-shaped passage 19 of the two-stage integrated on-off valve 8 are not limited, but an example of the configurations will be described below because the valve 20 and the L-shaped passage 19 are related to the two-stage switch valve 18 integrated with the electromagnetic valve 16.

The valve 20 has an approximately tubular shape. The valve 20 is driven in its axial direction by the armature 22 of the electromagnetic actuator 21 and the return spring 23. An inner space of the valve 20 on an end of the valve 20 is closed.

The L-shaped passage 19 is connected to a resin housing 24 of the electromagnetic actuator 21. The L-shaped passage 19 includes an inlet pipe 25 coupled to a pipe connected to the fuel tank 2, and an outlet pipe 26 coupled to a pipe connected to the canister 3. The outlet pipe 26 is arranged coaxially with a part of components of the electromagnetic valve 16 and the two-stage switch valve 18.

The L-shaped passage 19 includes a valve housing cylinder 27 being coaxial with the outlet pipe 26 and housing the valve 20 and the two-stage switch valve 18. The inlet pipe 25 is provided on a lateral side of the valve housing cylinder 27. A direction parallel to a center axis of the valve housing cylinder 27 will be referred to as an "axial direction".

A tubular insertion 28 having an approximately tubular shape is inserted into the valve housing cylinder 27. The tubular insertion 28 has an annular protrusion 29 that protrudes outward from an end of the tubular insertion 28 in a radial direction of the tubular insertion 28. The annular protrusion 29 is interposed to be held between the resin housing 24 of the electromagnetic actuator 21 and the valve housing cylinder 27 in the axial direction. An O-ring 30 is provided on an outer peripheral surface of the tubular insertion 28 and seals a gap between the valve housing cylinder 27 and the tubular insertion 28. An outer circumferential edge of a diaphragm 31 made of rubber is held between the tubular insertion 28 and the resin housing 24 of the electromagnetic actuator 21 in the axial direction. The diaphragm 31 is a ring-shaped partition member and prevents the fuel vapor in the L-shaped passage 19 from flowing toward the electromagnetic actuator 21. An inner circumferential edge of the diaphragm 31 is held between the valve 20 and the armature 22 in the axial direction.

A lateral surface of the tubular insertion 28 has an opening 32 through which the fuel vapor supplied from the inlet pipe 25 is introduced into the tubular insertion 28. Provided on a side of the tubular insertion 28 adjacent to the outlet pipe 26 are a valve seat 33 on which the valve 20 sits, and an upstream guide wall 34 that is one of two guide walls of the two-stage switch valve 18. The two guide walls of the two-stage switch valve 18 are the upstream guide wall 34 and a downstream guide wall 35.

The valve seat 33 has a through-hole on a center part. The through-hole extends through the valve seat 33 in the axial direction and is opened or closed by the valve 20. When the electromagnetic valve 16 is turned off, the valve 20 closes by contacting the valve seat 33. When the electromagnetic valve 16 is turned on, the valve 20 opens by separating from the valve seat 33.

For example, the ECU 13 turns on the electromagnetic valve 16 when a fuel is being put into the fuel tank 2. In a case other than the fueling case, the ECU 13 turns off the electromagnetic valve 16. More specifically, the ECU 13 may turn on the electromagnetic valve 16 when the ECU 13 receives a signal indicating that a cap of an oil filler hole, through which a fuel is supplied to the fuel tank 2, is opened. The ECU 13 may turn off the electromagnetic valve 16 when the ECU 13 receives a signal indicating that the cap of the oil filler hole is closed. Alternatively, the ECU 13 may turn on the electromagnetic valve 16 when a pressure detected by the tank pressure sensor 14 becomes higher than a predetermined valve-opening pressure due to fueling, for example. The ECU 13 may turn off the electromagnetic valve 16 when the pressure detected by the tank pressure sensor 14 becomes lower than a predetermined valve-closing pressure due to the opening of the electromagnetic valve 16 or completion of the fueling, for example.

The two-stage switch valve 18 includes a valve body 100 including the valve element 17. The valve element 17 has an outer circumferential edge that is supported and slidable in the axial direction in a flow passage constituting a part of the fuel vapor passage 5. The valve element 17 is subjected to a fluid pressure on an upstream side of the two-stage switch valve 18 in the flow passage. The two-stage switch valve 18 includes a spring 36 that urges the valve element 17 upstream in the flow passage. The spring 36 is a compression coil spring wound into an approximately conical shape. The spring 36 is interposed between the valve element 17 and a spring seat 37 provided on an inner wall of the L-shaped passage 19 while the spring 36 is compressed in the axial direction therebetween.

When the fluid pressure on the upstream side of the two-stage switch valve 18 increases, in other words, when a pressure of the fuel vapor supplied from the fuel tank 2 to the two-stage switch valve 18 increases, a fluid pressure on the valve element 17 increases. When the fluid pressure on the upstream side of the two-stage switch valve 18 is higher than a predetermined pressure (e.g., urging force of the spring 36), the valve element 17 reduces a cross-sectional area of the flow passage by moving downstream against the urging force of the spring 36 with the increase of the fluid pressure on the valve element 17. More specifically, as shown FIG. 3, the valve element 17 moves downstream toward the outlet pipe 26 to a predetermined downstream position. When the valve element 17 arrives at the downstream predetermined position, the outer circumferential edge of the valve element 17 contacts a ring seat 38 that is provided on the inner wall of the L-shaped passage 19 and has a step-like shape. When the outer circumferential edge of the valve element 17 contacts the ring seat 38, the fluid is prevented from flowing on an outer periphery of the valve element 17 and bypassing a communication hole 39 provided in the valve element 17. Thus, when the outer circumferential edge of the valve element 17 contacts the ring seat 38, the fluid flows from upstream of the valve element 17 to downstream of the valve element 17 only through the communication hole 39. A state where the valve element 17 contacts the ring seat 38 is referred to as a closed state of the two-stage switch valve 18.

When the fluid pressure on the upstream side of the two-stage switch valve 18 decreases, in other words, when the pressure of the fuel vapor supplied from the fuel tank 2 to the two-stage switch valve 18 decreases, the fluid pressure on the valve element 17 decreases. When the fluid pressure on the upstream side of the two-stage switch valve 18 is lower than or equal to the predetermined pressure (e.g., urging force of the spring 36), the valve element 17 increases the cross-sectional area of the flow passage by moving upstream toward the electromagnetic actuator 21 by the urging force of the spring 36 with the decrease of the fluid pressure on the valve element 17. More specifically, as shown FIG. 3, the valve element 17 starts moving upstream toward the outlet pipe 26 to a predetermined upstream position, and the outer circumferential edge of the valve element 17 is separated from the ring seat 38. When the outer circumferential edge of the valve element 17 is separated from the ring seat 38, the fluid flows on the outer periphery of the valve element 17 while flowing through the communication hole 39. A state where the valve element 17 is separated from the ring seat 38 is referred to as an open state of the two-stage switch valve 18. The cross-sectional area of the flow passage is changed in stages by the sliding of the valve element 17 in accordance with the fluid pressure on the upstream side of the two-stage switch valve 18 in the flow passage. Accordingly, a pressure and a flow rate of the fluid can be regulated.

Figures 2, 3:
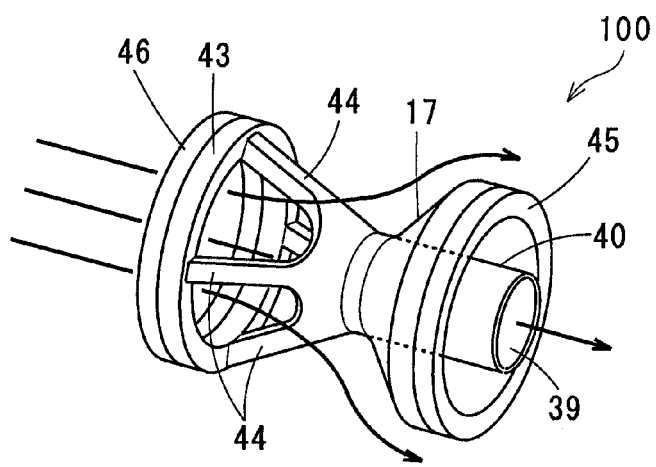
FIG. 2 is a schematic perspective view illustrating a valve body of the two-stage switch valve according to the exemplar embodiment.
FIG. 3 is a diagram illustrating a closed state and an open state of the two-stage switch valve according to the exemplar embodiment.

The two-stage switch valve 18 will be described more specifically. As shown in FIG. 2, an upstream part of the valve element 17 in a flow direction of the fluid is tapered and upstream to have an approximately conical shape such that a radially center part of the valve element 17 protrudes upstream in the flow passage. The center part of the valve element 17 has the communication hole 39 extending therethrough in the axial direction. The communication hole 39 serves as a hole through which an upstream side and a downstream side of the valve element 17 communicate with each other. The communication hole 39 is used as an example of a flow restrictor that reduces a flow rate of the fluid flowing from the upstream side to the downstream side of the valve element 17 when the two-stage switch valve 18 is in the closed state. Arrows shown in FIG. 2 indicate flows of the fluid.

The valve element 17 includes a small diameter cylinder 40 such the communication hole 39 extends through the small diameter cylinder 40 to be elongated. A base part of the small diameter cylinder 40, in other words, a corner part formed by an outer surface of the small diameter cylinder 40 and a downstream side surface of the valve element 17 serves as a spring seat 41 for the spring 36 on the downstream side of the valve element 17, as shown in FIG. 1. The small diameter cylinder 40 protrudes downstream in the flow passage from the downstream side of the valve element 17. A downstream end of the small diameter cylinder 40 is positioned downstream of a downstream end of the outer circumferential edge of the valve element 17 in the flow direction of the fluid.

A downstream part of the valve element 17 positioned downstream of the upstream part of the valve element 17 in the flow direction may have a radially outer surface that is circular cylindrical and relatively short in the axial direction. The radially outer surface of the downstream part of the valve element 17 is supported by the downstream guide wall 35 provided on the inner wall of the valve housing cylinder 27 such that the valve element 17 is slidable in the axial direction. The valve housing cylinder 27 having the downstream guide wall 35 is positioned between a downstream end of the above-described tubular insertion 28 and the ring seat 38 in the axial direction. The valve housing cylinder 27 includes multiple ribs 42 protruding inward from an inner wall of the valve housing cylinder 27. The number of the ribs 42 may be more than three. The downstream guide wall 35 is provided on an inner end surface of each rib 42. Spaces between the multiple ribs 42 in a circumferential direction of the valve housing cylinder 27 serve as passages through which the fluid flow on the outer periphery of the valve element 17 when the two-stage switch valve 18 is in the open state. Therefore, the spaces between the multiple ribs 42 may be used as an example of a flow relaxer that increases a flow rate of the fluid flowing from the upstream side to the downstream side of the valve element 17 when the two-stage switch valve 18 is in the open state.

The valve body 100 further includes an upstream guide 43 provided upstream of the valve element 17 in the flow direction of the fluid, and the upstream guide 43 has a ring shape and is supported in the flow passage slidably in the axial direction. An outer circumferential surface of the upstream guide 43 is circular cylindrical and relatively short in the axial direction, similar to the downstream part of the valve element 17. The outer circumferential surface of the upstream guide 43 is slidably supported by the upstream guide wall 34 provided on a radially inner surface of the tubular insertion 28. The upstream guide 43 is slidable in the axial direction on the upstream guide wall 34.

The valve body 100 further includes multiple legs 44 connecting the valve element 17 and the upstream guide 43 such that the valve element 17 and the upstream guide 43 are slidable together as a single member. The number of legs 44 may be four, for example. The multiple legs 44 are inclined from the axial direction and extend from the upstream guide 43 toward a center of the valve element 17. Each leg 44 extends straight from a downstream end surface of the upstream guide 43 to an edge of the center part of the valve element 17 that defines the communication hole 39. The multiple legs 44 may be arranged at a regular interval in the circumferential direction of the valve element 17, and the multiple legs 44 may extend outward in the radial direction from the valve element 17 to the upstream guide 43 in a cross-sectional surface of the flow passage.

The valve element 17, the small diameter cylinder 40, the upstream guide 43 and the multiple legs 44 are integrated into a single member by using resin material, for example. The single member may be made of a resin material as a whole. A downstream end surface of the outer circumferential edge of the valve element 17 is provided with a rubber stopper 45 that is made of a rubber material and has a ring shape. The rubber stopper 45 improves a sealing characteristic between the valve element 17 and the ring seat 38 when the valve element 17 is in contact with the ring seat 38. The rubber stopper 45 reduces a contact noise generated when the valve element 17 contacts the ring seat 38. Similarly, an upstream end surface of the upstream guide 43 is provided with a rubber stopper 46 that is made of a rubber material and has a ring shape. A technology to connect the valve element 17 and the rubber stopper 45 and a technology to connect the upstream guide 43 and the rubber stopper 46 may employ adhesive bonding, welding or integral molding, arbitrarily. The rubber stopper 45 and the rubber stopper 46 may be omitted.

Effects of the exemplar embodiment will be described below. According to the two-stage switch valve 18 of the exemplar embodiment, as described above, the upstream guide 43 having the ring shape is provided upstream of the valve element 17, and the outer circumferential surface of the upstream guide 43 and the outer circumferential edge of the valve element 17 are separated from each other in the axial direction and supported slidably in the axial direction. Since the upstream guide 43 is provided upstream of the valve element 17, inclination of the valve element 17 from its sliding direction (i.e. axial direction) can be limited. The valve element 17 can be prevented from getting stuck in the flow passage during sliding of the valve element 17, and malfunction of the two-stage switch valve 18 can be avoided.

The legs 44 connecting the upstream guide 43 and the valve element 17 are inclined from the axial direction and extend from the upstream guide 43 toward a center of the valve element 17, in other words, toward the edge of the center part of the valve element 17 that defines the communication hole 39. Accordingly, a connection part between the valve element 17 and the legs 44 is located on the center part of the valve element 17, and the connection part can be prevented from functioning as a flow resistance to the fluid flowing on the outer periphery of the valve element 17.

Figure 4:
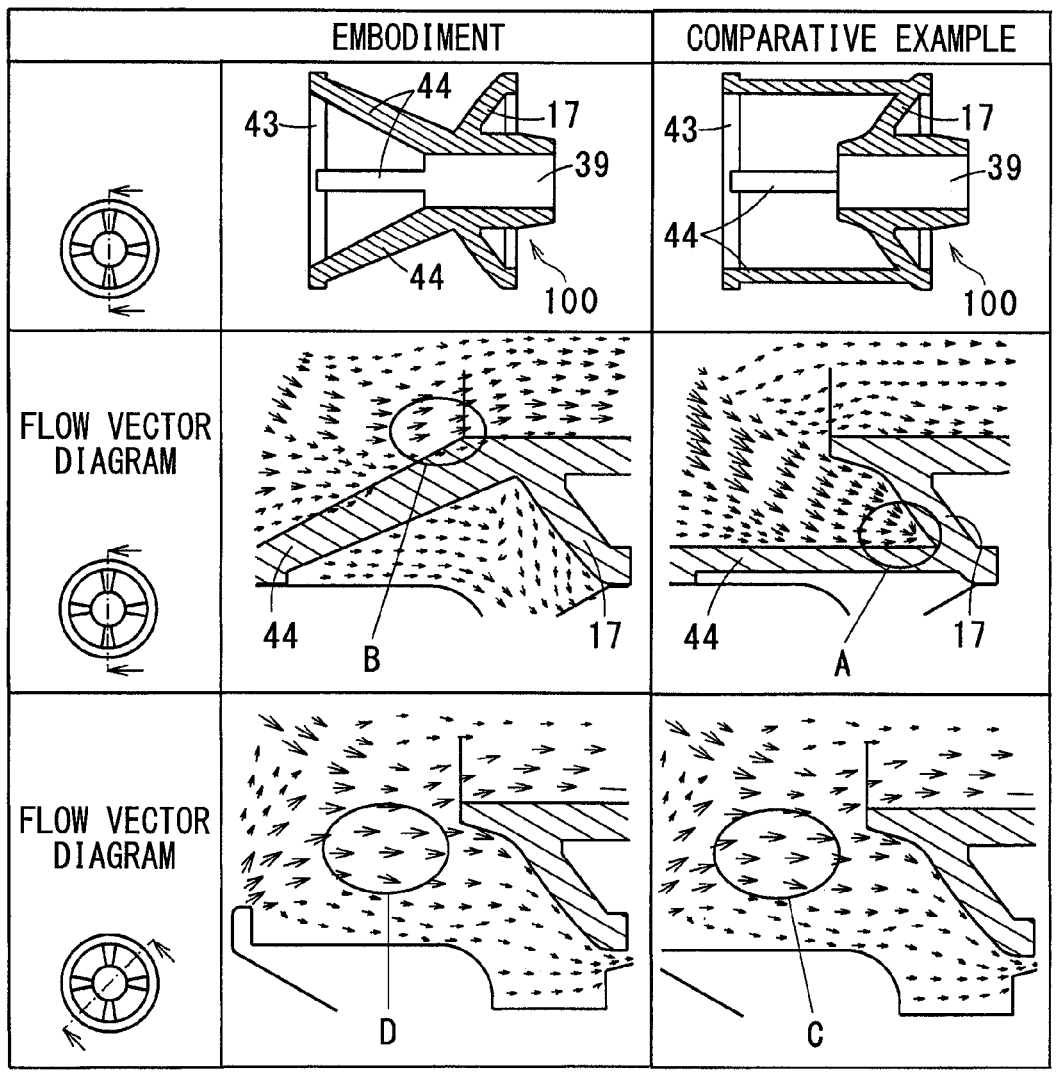
FIG. 4 is a comparative diagram illustrating the valve body according to the exemplar embodiment and a valve body according to a comparative example of the present disclosure.

Specific examples will be described with reference to FIGS. 4 and 5. The left column of FIG. 4 shows the exemplar embodiment while the right column of FIG. 4 shows a comparative example of the present disclosure. In the comparative example, as shown in the first row of the right column of FIG. 4, multiple legs 44 connect an upstream guide 43 and an outer circumferential edge of a valve element 17, in other words, the multiple legs 44 extend parallel to the axial direction from the upstream guide 43 to the outer circumferential edge of the valve element 17. In this case, as shown in the second row of the right column of FIG. 4, a flow rate of fluid around a connection part (A) between each leg 44 and the valve element 17 dramatically reduces, in other words, stagnation of the fluid occurs around the connection part (A), especially when the fuel pressure on the upstream side of the valve element 17 and a flow energy of the fluid are relatively low. Hence, the connection part (A) between each leg 44 and the valve element 17 may become a stagnation corner part that functions as a flow resistance to the fluid. When the legs 44 are provided to extend parallel to the axial direction, the connection part (A) between each leg 44 and the valve element 17 may function as the flow resistance to the fluid and may block a flow of the fluid that flows on an outer periphery of the valve element 17 to bypass the valve element 17.

On the other hand, in the exemplar embodiment of the present disclosure, as shown in the first row of the left column of FIG. 4, the legs 44 extend from the upstream guide 43 to the center part of the valve element 17 with being inclined from the axial direction. As shown in the second row of the left column of FIG. 4, a flow rate of the fluid around a connection part (B) between each leg 44 and the valve element 17 reduces little, in other words, stagnation of the fluid does not occur around the connection part (B). When the legs 44 extends from the upstream guide 43 to the center part of the valve element 17 with being inclined from the axial direction, the connection part (B) between each leg 44 and the valve element 17 does not function as the flow resistance to the fluid. Therefore, a flow of the fluid that flows on the outer periphery of the valve element 17 to bypass the valve element 17 is not blocked.

As shown in the third row of the left and right columns of FIG. 4, a flow rate of the fluid passing through an area (C) where the legs 44 are not provided in the comparative example is equivalent to a flow rate of the fluid passing through an area (D) where the legs 44 are not provided in the exemplar embodiment.

Figure 5:
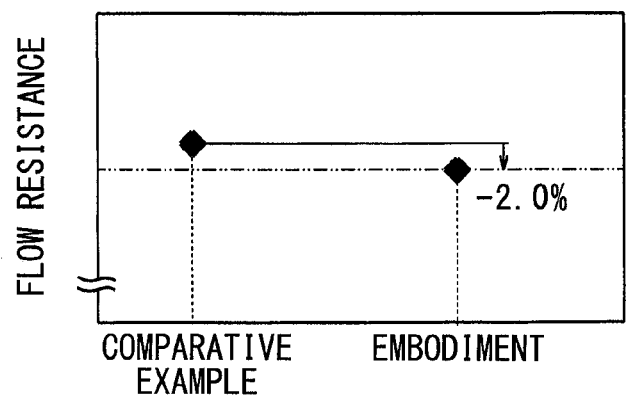
FIG. 5 is a diagram showing a difference in flow resistance between the exemplar embodiment and the comparative example.
Figure 6:
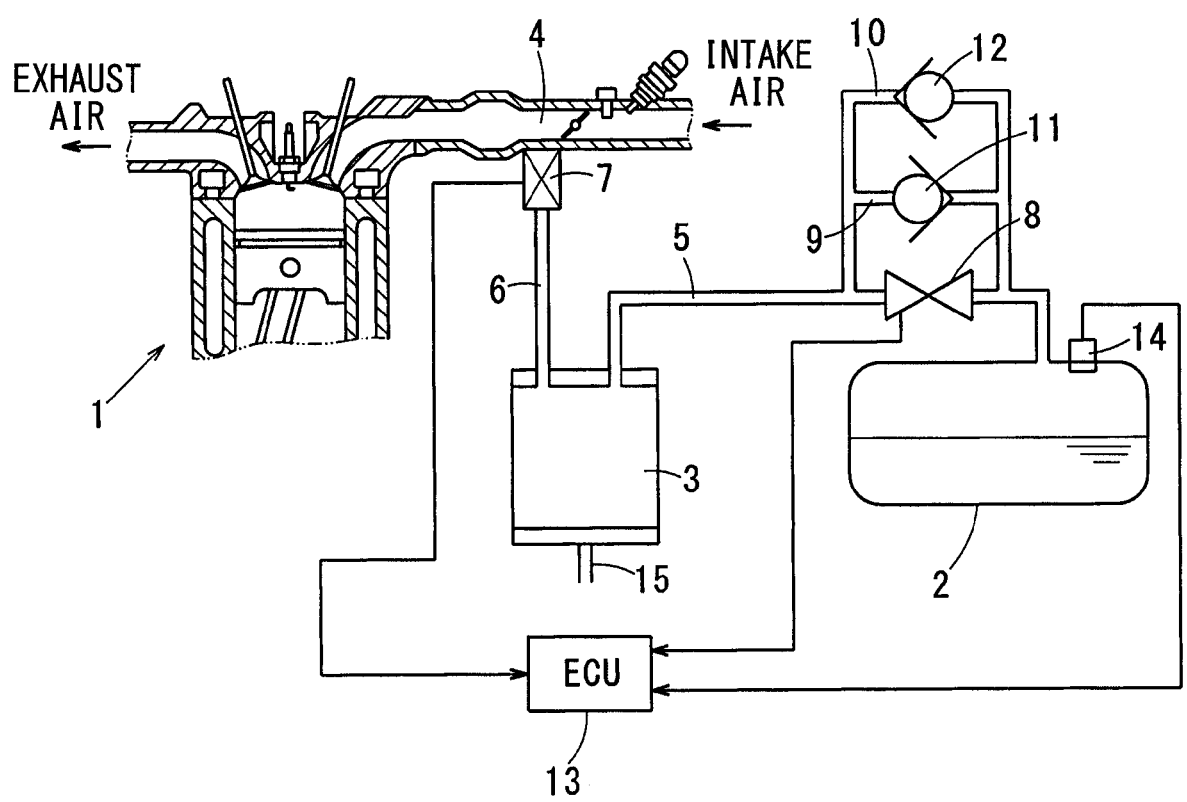
FIG. 6 is a sectional view illustrating the two-stage integrated on-off valve.

In comparison with the comparative example where the legs 44 are parallel to the axial direction, as shown in FIG. 5, a flow resistance can be reduced by about 2% in the exemplar embodiment where the legs 44 are inclined and extend to the center part of the valve element 17. According to the two-stage switch valve 18 of the exemplar embodiment of the present disclosure, inclination of the valve element 17 can be limited to prevent malfunction of the two-stage switch valve 18. Moreover, a flow resistance to the fluid bypassing the valve element 17 in the open state of the two-stage switch valve 18 can be reduced. Additionally, a flow of the fluid that flows on the outer periphery of the valve element 17 to bypass the valve element 17 can be prevented from being blocked around the base parts of the legs 44 that connected to the valve element 17.

The valve element 17 of the exemplar embodiment is, as described above, tapered such the center part of the valve element 17 protrudes upstream in the flow passage. When a distance in the axial direction between the outer circumferential edge of the valve element 17 and the upstream guide 43 is predetermined, a length of each leg 44 can be made shorter in the exemplar embodiment where the legs 44 are inclined and extend to the center part of the valve element 17 than the comparative example where the legs 44 are provided parallel to the axial direction.

Since the length of each leg 44 in the axial direction is relatively short in the exemplar embodiment, strength of the legs 44 can be enhanced. Moreover, the legs 44 are arranged to be a truss in the vicinity of the communication hole 39. Even when the legs 44 are made of thin members, strength of the single member including the upstream guide 43, the legs 44 and the valve element 17 can be kept high. Since the legs 44 can be made of thin members, a flow resistance produced by contact between the fluid and the legs 44 can be reduced.

The upstream part of the valve element 17 of the exemplar embodiment is tapered such that the center part of the valve element 17 protrudes upstream in the flow passage. When the valve element 17 is separated from the ring seat 38 and moves upstream, the fluid flows along a tapered surface of the valve element 17 on the outer periphery of the valve element 17 to bypass the valve element 17. The upstream part of the valve element 17 has a conical shape that is a streamline shape substantially. Hence, a flow resistance to the fluid bypassing the valve element 17 can be reduced.

As described above, the valve element 17 of the exemplar embodiment has the communication hole 39 in the center part of the valve element 17. The small diameter cylinder 40 defining the communication hole 39 functions as the spring seat 41 that supports the spring 36. The small diameter cylinder 40, which protrudes from the downstream side of the valve element 17, functions as the spring seat 41. The small diameter cylinder 40 may have an outer diameter that fits in an inner diameter of an end of the spring 36 such that the spring 36 is prevented from separating from the small diameter cylinder 40. In this case, ease of attachment of the spring 36 to the spring seat 41 can be increased. Since the small diameter cylinder 40 functions as the spring seat 41, the spring 36 can be certainly made to contact a predetermined position (i.e. designed position) of the valve element 17. Hence, a spring accuracy of the spring 36 can be improved.

As described above, the valve element 17 of the exemplar embodiment has the communication hole 39 in the center part of the valve element 17, and the small diameter cylinder 40 defines the communication hole 39. The downstream end of the small diameter cylinder 40 is positioned downstream of the downstream end of the outer circumferential edge of the valve element 17 in the flow direction of the fluid. Accordingly, the fluid flowing out of the communication hole 39 is prevented from flowing around the downstream end of the small diameter cylinder 40 and being accumulated on the downstream side of the valve element 17. Therefore, a flow rate of the fluid passing through the communication hole 39 can be stabilized, especially in the closed state of the two-stage switch valve 18.

Although the present disclosure has been fully described in connection with the preferred embodiments thereof with reference to the accompanying drawings, it is to be noted that various changes and modifications will become apparent to those skilled in the art.

In the exemplar embodiment, the two-stage switch valve 18 is combined with the electromagnetic valve 16 used as an example of the electric on-off valve. Consequently, the two-stage switch valve 18 and the electromagnetic valve 16 are used as the two-stage integrated on-off valve 8. More specifically, the two-stage integrated on-off valve 8 including the two-stage switch valve 18 and the electric on-off valve is disposed in the fuel vapor passage 5 between the canister 3 and the fuel tank 2. A part of components of the two-stage switch valve 18 and a part of components of the electromagnetic valve 16 can be used in common with each other. The number of components and the number of connection points between pipes can be reduced.

In the above-described embodiment, the two-stage switch valve 18 and the electromagnetic on-off valve (i.e. electromagnetic valve 16 in the above-described embodiment) are combined with each other to be a single member. Alternatively, the two-stage switch valve 18 may be provided independently.

In the above-described embodiment, the communication hole 39 is provided in the center part of the valve element 17, but the communication hole 39 may be located at a position shifted from the center part. For example, multiple communication holes 39 may be provided in the single valve element 17, and the multiple communication holes 39 may be positioned symmetrically with respect to the center of the valve element 17.

In the above-described embodiment, the two-stage switch valve 18 is used for the fuel-vapor treatment device, but the application of the two-stage switch valve 18 is not limited.

Additional advantages and modifications will readily occur to those skilled in the art. The disclosure in its broader terms is therefore not limited to the specific details, representative apparatus, and illustrative examples shown and described.

What is claimed is:

1. A two-stage switch valve comprising:
a valve body including a valve element having an outer circumferential edge which continuously slides on an inner wall of a flow passage during the valve element moving between a predetermined upstream position and a predetermined downstream position in the flow passage, and being subjected to a fluid pressure on an upstream side of the valve element in a flow direction of a fluid in the flow passage; and
a spring urging the valve element upstream in the flow passage, wherein,
when the fluid pressure on the upstream side of the valve element is higher than a predetermined pressure, the valve element moves downstream against an urging force of the spring to the predetermined downstream position where the fluid flows from the upstream side to a downstream side of the valve element through a communication hole that extends through the valve element,
when the fluid pressure on the upstream side of the valve element is lower than or equal to the predetermined pressure, the valve element moves upstream by the urging force of the spring to the predetermined upstream position where the fluid flows from the upstream side to the downstream side of the valve element through the communication hole and with flowing on an outer periphery of the valve element to bypass the communication hole, and
the valve body includes:
an upstream guide having a ring shape and being supported slidably in the flow passage, the upstream guide being located upstream of the valve element in the flow direction of the fluid; and
a plurality of legs connecting the upstream guide and the valve element, the plurality of legs being inclined from an axial direction of the upstream guide, the plurality of legs extending from the upstream guide toward a center of the valve element.

2. The two-stage switch valve according to claim 1, wherein the valve element is tapered upstream in the flow direction of the fluid such that a center part of the valve element protrudes upstream in the flow passage.

3. The two-stage switch valve according to claim 1, wherein
the communication hole is provided in a center part of the valve element,
the valve element includes a small diameter cylinder defining the communication hole, and
the small diameter cylinder is in contact with an end of the spring and functions as a spring seat for the spring.

4. The two-stage switch valve according to claim 1, wherein
the communication hole is provided in a center part of the valve element,
the valve element includes a small diameter cylinder defining the communication hole, and
the small diameter cylinder has a downstream end positioned downstream of a downstream end of the outer circumferential edge of the valve element in the flow direction of the fluid.

5. A two-stage integrated on-off valve comprising:
the two-stage switch valve according to claim 1; and
an electric on-off valve that opens or closes the flow passage, wherein the two-stage switch valve and the electric on-off valve are combined to be a single member.

6. The two-stage integrated on-off valve according to claim 5, being located in a fuel vapor passage through which a canister communicates with a fuel tank and holds a fuel vapor generated in the fuel tank.

7. The two-stage switch valve according to claim 1, further comprising a recessed space on the inner wall of the flow passage, wherein the recessed space serves as a passage through which the fluid flows on the outer periphery of the valve element to bypass the communication hole when the valve element is located at the predetermined upstream position.

8. The two-stage switch valve according to claim 1, further comprising:
a ring seat located downstream of the valve element, wherein
a downstream surface of the valve element is in contact with the ring seat when the valve element is located at the predetermined downstream position, and
the downstream surface of the valve element is spaced apart from the ring seat when the valve element is located at the predetermined upstream position.

9. The two-stage switch valve according to claim 8, wherein
the downstream surface of the valve element is provided with a rubber stopper to improve a sealing characteristic between the valve element and the ring seat when the valve element contacts the ring seat.

10. The two-stage switch valve according to claim 3, wherein
the valve element further includes a tapered cylindrical member which is tapered upstream in the flow direction of the fluid,
an upstream end of the tapered cylindrical member is joined with an upstream end of the small diameter cylinder such that a recess is formed between the tapered cylindrical member and the small diameter cylinder,
the spring is a coil spring tapered upstream to the small diameter cylinder of the valve element, and
an upstream end of the spring is fitted into the recess formed between the tapered cylindrical member and the small diameter cylinder.

11. The two-stage switch valve according to claim 1, wherein
the upstream guide has an outer circumferential surface that continuously slides on the inner wall of the flow passage during the valve element moving between the predetermined upstream position and the predetermined downstream position in the flow passage.

12. The two-stage switch valve according to claim 1, wherein
a downstream end surface of the outer circumferential edge of the valve element is provided with a first rubber stopper having a ring shape.

13. The two-stage switch valve according to claim 12, wherein
an upstream end surface of the upstream guide is provided with a second rubber stopper having a ring shape.

\* \* \* \* \*